United States Patent Office 2,844,632
Patented July 22, 1958

2,844,632
NEW COMPOSITION OF MATTER

Teh-Fu Yen, Akron, Ohio, assignor to The Goodyear Tire & Rubber Company, Akron, Ohio, a corporation of Ohio No Drawing. Application June 12, 1956
Serial No. 590,842

1 Claim. (Cl. 260—608)

This invention relates to the new composition of matter, bis-(4-beta-hydroxyethyl-1-naphthyl) disulfide. A method of preparation is given below.

EXAMPLE 1

To a stirred suspension of 7.6 grams of lithium aluminum hydride in 600 milliliters of anhydrous ethyl ether, 25.2 grams of 4-chlorosulfonyl-1-naphthyl acetic acid (prepared as described in copending application, Serial No. 590,820, filed July 12, 1956) in 400 milliliters of anhydrous ethyl ether was slowly introduced. The reaction mixture was gently heated to reflux for 8 hours. Toward the end of reaction the contents became a yellowish, white mass. This mass was carefully hydrolyzed with water and the organic phase separated. Upon drying the organic phase or the ethereal solution by means of a desiccant and removing the ether by evaporation, a yellow solid was left. After recrystallization from a mixture of benzene/n-hexane, a fine yellowish powder was obtained. This material had a melting point of 115–117° C. Analysis, by the method described below, showed a purity of 95% by weight, if this material were calculated as bis-(4-beta-hydroxyethyl-1-naphthyl) disulfide. This compound may be represented by the formula:

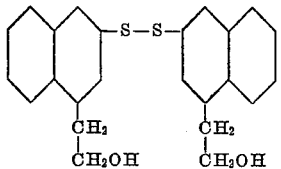

Method for the determination of disulfides

This method is a modification of "The estimation of thiols and disulfides by potentiometric titration with silver nitrate," reported in Biochemical Journal (University of Oxford, England) 59, 234–240 (1955) by R. Cecil and J. R. McPhee.

The equipment consists of commercialy available materials such as a potentiometer equipped with both a glass and a silver electrode. Stirring was achieved by means of a magnetic stirrer.

For instance, in copending Serial No. 590,824, filed June 12, 1956, at page 45, line 10, the following example is described: an addition polymer of 75 parts butadiene and 25 parts styrene was made in a recipe as follows:

|  | Parts |
| --- | --- |
| Monomers | 100 |
| Water | 200 |
| Soap flakes | 5 |
| Bis-azo-isobutyronitrile | 0.3 |
| Modifier—Varied. | | using 1 part of bis-(4-β-hydroxyethyl-1-naphthyl) disulfide as the modifier, a polymer was reacted to 19% conversion in 16 hours at 50° C. This polymer had a dilute solution viscosity of 1.1, whereas, an identical control polymer, except that it contained no modifier, reacted to 20% conversion in 2 hours at 50° C. was only 10% soluble. Thus is illustrated the use of bis-(4-β-hydroxyethyl-1-naphthyl) disulfide as a modifier in the polymerization of an addition polymer of butadiene and styrene, forming a synthetic rubber.

Procedure:

An alcoholic solution of a weighed amount of the particular disulfide desired to be tested was added to a stirred solution made up as follows:

(A) 100 milliliters of 0.5% by weight ammonium oleate, (B) 5 milliliters of concentrated ammonium hydroxide, (C) 15 milliliters of saturated sodium sulfite and (D) approximately a two-fold excess of a known standard silver nitrate solution (the excess here is based upon the amount of disulfide to be tested).

This mixture is heated to mild boiling for 0.5 hour and allowed to cool to room temperature. The excess silver nitrate is back titrated with a standard dodecyl mercaptan solution in alcohol. The endpoint of the titration is determined by procedures normally used in potentiometric titration analysis. The calculations are based on the fact that the sodium sulfite reduces one mol of the disulfide to one mol of the mercaptan.

This material has been found particularly useful as a modifier in the preparation of synthetic rubber.

While certain representative embodiments and details have been shown for the purpose of illustrating the invention, it will be apparent to those skilled in this art that various changes and modifications may be made therein without departing from the spirit or scope of the invention.

What is claimed is:

As a new composition of matter, bis-(4-beta-hydroxyethyl-1-naphthyl) disulfide defined by the formula:

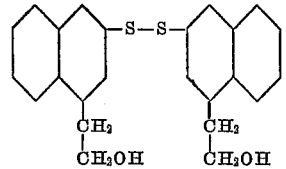

No references cited.

UNITED STATES PATENT OFFICE
CERTIFICATE OF CORRECTION

Patent No. 2,844,632                                                             July 22, 1958

Teh-Fu Yen

It is hereby certified that error appears in the printed specification of the above numbered patent requiring correction and that the said Letters Patent should read as corrected below.

Column 1, line 24, for the date "July 12, 1956" read --June 12, 1956--; line 58, strike out the paragraph beginning with "For instance" and ending with "synthetic rubber." in column 2, line 20, and insert the same before the paragraph beginning with "While certain" in line 41, column 2.

Signed and sealed this 14th day of October 1958.

(SEAL)
Attest:

KARL H. AXLINE

Attesting Officer

ROBERT C. WATSON
Commissioner of Patents